United States Patent Office 3,639,540
Patented Feb. 1, 1972

3,639,540
SULFINYL PHENYL ESTERS OF THIONOPHOSPHORIC OR THIONOPHOSPHONIC ACIDS
Richard Sehring, Ingelheim am Rhein, Germany, assignor to C. H. Boehringer Sohn, Ingelheim am Rhein, Germany
No Drawing. Filed Dec. 3, 1968, Ser. No. 780,870
Claims priority, application Germany, Dec. 4, 1967, P 16 43 706.2; Feb. 27, 1968, P 16 43 764.2
Int. Cl. C07f 9/18; A01n 9/36
U.S. Cl. 260—949
2 Claims

ABSTRACT OF THE DISCLOSURE

Sulfinylphenyl esters of thionophosphoric acid or thionophosphonic acid and are useful as insecticides and acaricides.

---

This invention relates to novel esters of thionophosphoric acid or thionophosphonic acid, as well as to a method of preparing these compounds.

More particularly, the present invention relates to a novel class of compounds of the formula

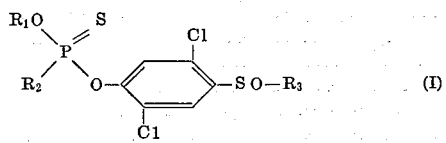

wherein
  $R_1$ is alkyl of 1 to 3 carbon atoms,
  $R_2$ is alkyl of 1 to 3 carbon atoms, methoxy, ethoxy or phenyl, and
  $R_3$ is alkyl of 1 to 4 carbon atoms.

The compounds of the Formula I above may be prepared by a method involving well known chemical principles, namely, by reacting a dichlorophenol of the formula

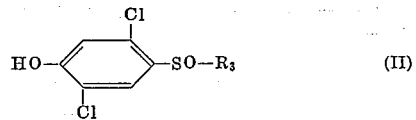

wherein $R_3$ has the same meanings as in Formula I, or a salt, especially an alkali metal salt, thereof with a halide of thionphosphoric acid or thionophosphonic acid of the formula

wherein X is chlorine or bromine and $R_1$ and $R_2$ have the same meanings as in Formula I, in the presence of an inert solvent and an acid-binding agent at elevated temperatures. Examples of suitable solvents are organic solvents, such as ketones, aromatic hydrocarbons, ethers and halogenated hydrocarbons, especially toluene, dioxane or methyl isobutyl ketone, or also water.

The majority of the compounds according to the present invention are non-distillable oils, and a few are crystalline substances. The compounds are thin-layer chromatographically uniform, using as the flow agent a mixture of hexane and acetone (2:1), developed with a 3% palladium chloride solution.

The dichlorophenols of the Formula II, used as starting compounds, may be prepared by the following method:

A suitable, tetrachlorobenzene, such as 1,2,3,4-tetrachlorobenzene, preferably in slight stoichiometric excess, is reacted at moderately elevated temperatures with a mercaptan of the formula $$R_3\text{—SH} \qquad (IV)$$

wherein $R_3$ has the same meanings as in Formula I, and with a molar equivalent of an alkali metal hydroxide in aqueous-methanolic solution. Upon working up the reaction mixture in the usual manner, a good yield of the principal reaction product, i.e. the corresponding 1-($R_3$-mercapto)-2,3,6-trichlorobenzene, is obtained. In addition, the isomeric secondary reaction product, i.e. the corresponding 1-($R_3$-mercapto)-2,3,4-trichlorobenzene, can be isolated from the reaction mixture. These compounds are then hydrolized with aqueous-methanolic alkali metal hydroxide; for instance, hydrolysis of a 1-($R_3$-mercapto)-2,3,6-trichlorobenzene produces high yields of a 2-($R_3$-mercapto)-3,4-dichlorophenol as the principal product and a 2-($R_3$-mercapto)-3,6-dichlorophenol as a secondary reaction product. The isomers may be separated in customary fashion, such as by fractional distillation.

In analogous manner, other tetrachlorobenzenes may be reacted in like fashion, for instance, 1,2,4,5-tetrachlorobenzene produces good yields of a 4-($R_3$-mercapto)-2,5-dichlorophenol by way of the corresponding intermediate 1-($R_3$-mercapto)-2,4,5-trichlorobenzene.

The conversion of a dichloro-($R_3$-mercapto)-phenol into the corresponding $R_3$-sulfinyl compound by oxidation may be effected in customary fashion with hydrogen peroxide in glacial acetic acid.

The following examples further illustrate the present invention and will enable others skilled in the art to understand it more completely. It should be understood, however, that the invention is not limited solely to the particular examples given below.

EXAMPLE 1

(a) O,O-diethyl-O-(2,5-dichloro-4-methylsulfinylphenyl)-thionophosphate (mol. weight 377.26)

24.7 gm. (0.1 mol) of sodium 2,5-dichloro-4-methylsulfinylphenolate (M.P. of the phenol 210° C.) were stirred in 70 ml. of methyl isobutyl ketone with 20.8 gm. (0.11 mol) of O,O-diethyl-thionophosphoric acid chloride for three hours at 80° C. Then, the solvent was distilled off, the residue was dissolved in methylene chloride, and the solution was extracted with water, with 2 N sodium hydroxide solution and again with water and dried over sodium sulfate. The methylene chloride was distilled off, and the residue was heated for half an hour on a boiling water bath under an oil pump vacuum.

Yield: 35.7 gm. (95% of theory), M.P. 58–59° C., of the compound

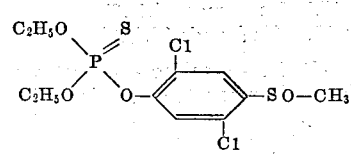

Analysis:
  P calc.: 8.22%; found: 8.14%
  S calc.: 17.03%; found: 16.94%
  Cl calc.: 18.81%; found: 19.00%

Analogous to Example 1(a), the following compounds were produced:

(b) O,O - dimethyl-O-(2,5 - dichloro - 4 - methylsulfinylphenyl)-thionophosphate from sodium 2,5-dichloro-4-methylsulfinylphenolate and O,O-dimethyl-thionophosphoric acid chloride: Yield 31 gm. (90% of theory); mol. weight 349.21.

Analysis:
 P calc.: 8.87%; found: 8.72%
 S calc.: 18.36%; found: 18.30%
 Cl calc.: 20.26%; found: 20.10%

(c) O-methyl-O-(2,5-dichloro - 4 - methylsulfinylphenyl)-methyl-thionophosphonate of the formula

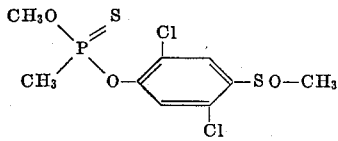

from sodium 2,5-dichloro-4-methylsulfinyl-phenolate and methyl - thionophosphonic acid methyl ester chloride: Yield: 30 gm. (90% of theory); mol. weight 333.21.

Analysis:
 P calc.: 9.30%; found: 9.40%
 S calc.: 19.28%; found: 19.20%
 Cl calc.: 21.28%; found: 21.34%

(d) O-ethyl-O-(2,5 - dichloro - 4 - methylsulfinylphenyl)-methyl-thionophosphonate from sodium 2,5-dichloro-4-methylsulfinylphenolate and methyl-thionophosphonic acid ethyl ester chloride: Yield: 30 gm. (87% of theory); mol. weight 347.24.

Analysis:
 P calc.: 8.93%; found: 8.76%
 S calc.: 18.50%; found: 18.28%
 Cl calc.: 20.42%; found: 20.20%

(e) O-ethyl-O-(2,5 - dichloro - 4 - methylsulfinylphenyl)-ethyl-thionophosphonate from sodium 2,5-dichloro-4-methylsulfinylphenolate and ethyl-thionophosphonic acid ethyl ester chloride: Yield: 30 gm. (83% of theory); mol. weight 361.26.

Analysis:
 P calc.: 8.56%; found: 8.50%
 S calc.: 17.78%; found: 17.92%
 Cl calc.: 19.64%; found: 19.47%

(f) O-n-propyl-O-(2,5 - dichloro-4-methylsulfinylphenyl)-methyl-thionophosphonate from sodium 2,5-dichloro-4-methylsulfinylphenolate and methyl-thionophosphoric acid n-propyl ester chloride: Yield: 29 gm. (82% of theory); mol. weight 361.26.

Analysis:
 P calc.: 8.56%; found: 8.47%
 S calc.: 17.78%; found: 17.86%
 Cl calc.: 19.64%; found: 19.80%

(g) O-isopropyl-O-(2,5 - dichloro - 4 - methylsulfinylphenyl)-methyl-thionophosphonate from sodium 2,5-dichloro-4-methylsulfinylphenolate and methyl-thionophosphoric acid isopropyl ester chloride: Yield: 28 gm. (80% of theory); mol. weight 361.26.

Analysis:
 P calc.: 8.56%; found: 8.50%
 S calc.: 17.78%; found: 17.52%
 Cl calc.: 19.64%; found: 19.52%

(h) O-ethyl-O-(2,5 - dichloro - 4 - methylsulfinylphenyl)-phenyl-thionophosphonate of the formula

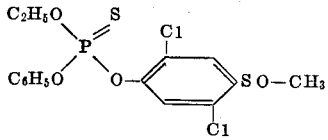

from sodium 2,5-dichloro-4-methyl-sulfinylphenolate and phenyl-thionophosphonic acid ethyl ester chloride: Yield: 33 gm. (82% of theory); mol. weight 409.29.

Analysis:
 P calc.: 7.58; found: 7.42%
 S calc.: 15.68%; found: 15.60%
 Cl calc.: 17.35%; found: 17.30%

EXAMPLE 2

O,O-dimethyl-O-(2-methylmercapto-3,4-dichlorophenyl)-thionophosphate (a) 1-methylmercapto-2,3,6-trichlorobenzene.—A mixture of 2462 gm. (11.4 mol) of 1,2,3,4-tetrachlorobenzene, 6000 ml. of methanol, 855 gm. of aqueous 47% technical grade sodium hydroxide solution (10 mol) and 480 gm. (10 mol) of methylmercaptan was heated at 130° C. for 20 hours in an autoclave equipped with a stirrer. After cooling, the sodium chloride formed by the reaction was removed, the methanol was distilled off, and the reaction product was distilled in vacuo in a fractional distillation column. After the unreacted 1,2,3,4-tetrachlorobenzene had distilled off, 1420 gm. (62.5% of theory) of 1-methylmercapto-2,3,6-trichlorobenzene distilled over at 95–96° C./0.3 mm. Hg. From the residue (400 gm.), 1-methylmercapto-2,3,4-trichlorobenzene and 1,2-methylmercapto-3,4-dichlorobenzene may be isolated.

(b) 2-methylmercapto-3,4-dichlorophenol.—A mixture of 113.5 gm. (0.5 mol) of 1-methylmercapto-2,3,6-trichlorobenzene, 42 gm. of sodium hydroxide and 400 ml. of methanol was heated at 115° C. for twelve hours in an autoclave equipped with a stirrer. After cooling, the methanol was distilled off, the phenolate was dissolved by addition of water, and the aqueous solution was extracted with toluene. In order to liberate the phenol, the aqueous phase was acidified. Yield: 85 gm. (81.3% of theory). The reaction product was a mixture of 76% of 1-methylmercapto-3,4-dichlorophenol and 24% of 1-methylmercapto-3,6-dichlorophenol, as verified by NMR-spectrum and gas chromatographical analysis. For separation of the isomers a fractionating column was used.

(c) O,O-dimethyl-O-(2-methylmercapto - 3,4 - dichlorophenyl) - thionophosphate (mol. weight 333.21).—115 gm. of sodium 2-methylmercapto-3,4-dichlorophenolate were dissolved in 700 ml. of methyl isobutyl ketone, and the solution was heated to 70–80° C. 90 gm. of O,O-dimethylthiophosphoric acid chloride were added dropwise, and the mixture was allowed to stand at this temperature for three hours. After cooling, the reaction solution was filtered, and the solvent was distilled off. The residue was dissolved in methylenechloride, and the solution was washed with water. The methylene chloride was distilled from the organic phase, yielding 150 gm. (91% of theory) of the crude ester, B.P. 143–145° C./0.1 mm. Hg, of the formula

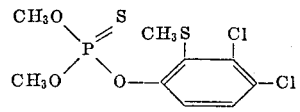

Analysis:
 P calc.: 9.30%; found: 9.20%
 S calc.: 19.28%; found: 19.46%
 Cl calc.: 21.28%; found: 21.30%

EXAMPLE 3

Using a procedure analogous to that described in Example 2(c), O,O - diethyl - O - (2-methylmercapto-3,4-dichlorophenyl)-thionophosphate (mol. weight 361.26), B.P. 154–155° C. at 0.1 mm. Hg, was prepared from equimolar quantities of O,O-diethyl-thionophosphoric acid chloride and sodium 2-methylmercapto-3,4-dichlorophenolate. Yield: 125 gm. (94.5% of theory).

Analysis:
 P calc.: 8.56%; found: 8.62%
 S calc.: 17.78%; found: 17.80%
 Cl calc.: 19.64%; found: 19.60%

EXAMPLE 4

Using a procedure analogous to that described in Example 2(c), O,O-diethyl - O - (2-methylmercapto-3,6-dichlorophenyl)-thionophosphate (mol. weight 361.26), B.P. 155° C. at 0.1 mm. Hg, was prepared from equimolar quantities of O,O-diethyl-thionophosphoric acid chloride and sodium 2-methylmercapto-3,6-dichlorophenolate. Yield: 93.7% of theory.

Analysis:
 P calc.: 8.56%; found: 8.62%
 S calc.: 17.78%; found: 17.88%
 Cl calc.: 19.64%; found: 19.60%

EXAMPLE 5

O,O - diethyl-O-(2-methylmercapto-3,4-dichlorophenyl)-thionophosphate and O,O-diethyl-O-(2-methylmercapto-3,6-dichlorophenyl)-thionophosphate in the ratio 76:24

(a) The phenol mixture obtained according to Example 2(b) was reacted in phenolate-form with O,O-diethyl-thionophosphoric acid chloride and worked up as described in Example 2(c). Yield: 94% of theory; B.P. 152°–155° C. at 0.1 mm. Hg.

Analogous to Example 2(c) the following compounds were also prepared:

(b) O,O-dimethyl - O - (2-methylsulfinyl-3,4-dichlorophenyl)-thionophosphate, an unstable oil, from sodium 2-methylsulfinyl-3,4-dichlorophenolate and O,O-dimethyl-thionophosphoric acid chloride. Yield: 81% of theory.

(c) O,O-diethyl - O - (2 - methylsulfinyl-3,4-dichlorophenyl)-thionophosphate from sodium 2-methylsulfinyl-3,4-dichlorophenolate and O,O-diethylthionophosphoric acid chloride. Yield: 82% of theory.

(d) O-ethyl-O-(2-methylmercapto-3,4-dichlorophenyl)-ethylthionophosphonate from sodium 2-methylmercapto-3,4-dichlorophenolate and O-ethyl-ethylthionophosphonic acid chloride. Yield: 84% of theory; mol. weight 345.26

Analysis:
 P calc.: 8.98%; found: 9.00%
 S calc.: 18.60%; found: 18.68%
 Cl calc.: 20.58%; found: 20.70%

(e) O-ethyl-O-(2-methylmercapto-3,4-dichlorophenyl)-phenylthionophosphonate from sodium 2-methylmercapto-3,4 - dichlorophenolate and O-ethyl-phenylthionophosphonic acid chloride. Yield: 98% of theory; mol. weight 393.29.

Analysis:
 P calc.: 7.89%; found: 8.03%
 S calc.: 16.32%; found: 16.50%
 Cl calc.: 18.02%; found: 18.00%

2-methylsulfinyl-3,4-dichlorophenol was obtained from the corresponding 2-methylmercapto compound by oxidation with the molecular quantity of hydrogen peroxide in glacial acetic acid at 0 to 40° C. in conventional fashion. The phenol melted at 216–218° C.

EXAMPLE 6

(a) O,O-diethyl-O-(2,5-dichloro-4-octylsulfinylphenyl)-thionophosphate (mol. weight 475.43)

34.7 gm. (0.10 mol) of sodium 2,5-dichloro-4-octylsulfinylphenolate were reacted in 70 ml. of methyl isobutyl ketone with 20.8 gm. (0.11 mol) or O,O-diethyl-thionophosphoric acid chloride. The reaction mixture was stirred for three hours at 80° C., subsequently the solvent was distilled off, the residue dissolved in methylene chloride, and the solution was extracted with water, then with 2 N sodium hydroxide, then again with water. The organic phase was dried over sodium sulfate and evaporated, and the residue was heated for half an hour on a boiling water bath in an oil pump vacuum. Yield: 46 gm. (97% of theory).

Analysis:
 P calc.: 6.52%; found: 6.48%
 S calc.: 13.47%; found: 13.40%
 Cl calc.: 14.92%; found: 14.80%

(b) In analogous manner O,O-diethyl-O-(2,5-dichloro-4-butylsulfinylphenyl)-thionophosphonate (mol. weight 419.32) was prepared from sodium 2,5-dichloro-4-butyl sulfinylphenolate (0.10 mol) and O,O-diethyl-thionophosphoric acid chloride (0.11 mol). Yield: 40.0 gm. (95.5% of theory).

Analysis:
 P calc.: 7.38%; found: 7.38%
 S calc.: 15.23%; found: 15.10%
 Cl calc.: 16.91%; found: 16.80%

EXAMPLE 7

(a) O,O-diethyl-O-(2,5-dichloro-4-octylmercaptophenyl)thionophosphate (mol. weight 459.43)

32.4 gm. (0.10 mol) of 2,5-dichloro-4-octylmercaptophenol were dissolved in 20 ml. of 5 N sodium hydroxide. At 60–70° C. 20.8 gm. (0.11 mol) of O,O-diethyl-thionophosphoric acid chloride were added dropwise; subsequently, the mixture was stirred for three hours at 80–85° C. The oily phase was taken up in methylene chloride, and the solution was washed with 2 N sodium hydroxide and then with water. The methylene chloride solution was dried over sodium sulfate, filtered and evaporated. The residue was heated on a boiling water bath in an oil pump vacuum for half an hour. Yield: 44.2 gm. (96.5% of theory).

Analysis:
 P calc.: 6.76%; found: 6.60%
 S calc.: 13.93%; found: 13.80%
 Cl calc.: 15.43%; found: 15.20%

In analogous manner the following compounds were also prepared:

(b) O,O - diethyl-O-(2,5-dichloro-4-cyclohexylmercaptophenyl)-thionophosphate (mol. weight 429.26) of the formula

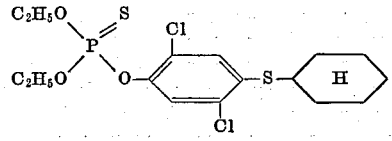

from 2,5-dichloro-4-cyclohexylmercaptophenol (0.10 mol) and O,O-diethyl-thionophosphoric acid chloride (0.11 mol): Yield: 41.5 gm. (97% of theory).

Analysis:
 P calc.: 7.21%; found: 7.10%
 S calc.: 14.85%; found: 14.90%
 Cl calc.: 16.53%; found: 16.60%

(c) O,O-dimethyl-O-(2,5-dichloro - 4 - cyclohexylmercaptophenyl)-thionophosphonate (mol. weight 401.21) from 2,5-dichloro - 4 - cyclohexylmercaptophenol (0.10 mol) and O,O-dimethyl-thionophosphoric acid chloride (0.11 mol). Yield: 37.0 gm. (92.3% of theory).

Analysis:
 P calc.: 7.73%; found: 7.71%
 S calc.: 15.98%; found: 16.02%
 Cl calc.: 17.73%; found: 17.60%

(d) O,O-diethyl-O-(2,5-dichloro - 4 - isopropylsulfinylphenyl)-thionophosphate (mol. weight 405.30) from 2,5-dichloro-4-isopropylsulfinylphenol (0.10 mol) and and O,O-diethyl-thionophosphoric acid chloride (0.11 mol). Yield: 36.8 gm. (90.8% of theory).

Analysis:
 P calc.: 7.65%; found: 7.55%
 S calc.: 15.80%; found: 15.45%
 Cl calc.: 17.52%; found: 17.30%

(e) O,O-diethyl-O-(2,5-dichloro - 4 - butylsulfinylphenyl)-thionophosphate (mol. weight 419.32) from 2,5-dichloro-4-butylsulfinylphenol (0.10 mol) and O,O-diethyl-thionophosphoric acid chloride (0.11 mol). Yield: 39.5 gm. (94.2% of theory).

Analysis:
P calc.: 7.38%; found: 7.30%
S calc.: 15.23%; found: 15.11%
Cl calc.: 16.91%; found: 16.82%

(f) O,O-dimethyl - O - (2,5-dichloro - 4 - butylsulfinyl-phenyl)-thionophosphate (mol. weight 391.27) from 2,5-dichloro-4-butylsulfinylphenol (0.10 mol) and O,O-dimethyl-thionophosphoric acid chloride (0.11 mol). Yield: 37.1 gm. (94.9% of theory).

Analysis:
P calc.: 7.93%; found: 7.90%
S calc.: 16.36%; found: 16.42%
Cl calc.: 18.16%; found: 18.12%

(g) O,O-diethyl-O-(3,4-dichloro - 2 - ethylmercapto-phenyl)-thionophosphate (mol. weight 375.27) from 3,4-dichloro-2-ethylmercaptophenol (0.10 mol) and O,O-diethyl-thionophosphoric acid chloride (0.11 mol). Yield: 35 gm. (93.9% of theory).

Analysis:
P calc.: 8.25%; found: 8.20%
S calc.: 17.06%; found: 16.93%
Cl calc.: 18.92%; found: 18.84%

(h) O,O-diethyl - O - (3,4-dichloro - 2 - ethylsulfinyl-phenyl)-thionophosphate (mol. weight 391.27) from 3,4-dichloro-2-ethylsulfinylphenol (0.10 mol) and O,O-diethyl-thionophosphoric acid chloride (0.11 mol). Yield: 36.3 gm. (92.8% of theory).

Analysis:
P calc.: 7.93%− found: 7.85%
S calc.: 16.37%; found: 16.33%
Cl calc.: 18.15%; found: 18.07%

The novel compounds according to the present invention, that is, those embraced by the Formula I above, are highly effective broad-spectrum pesticides; they act not only as contact poisons but also as alimentary canal poisons. Their toxicity toward warm-blooded animals is extremely low. They are particularly effective against red spider mites, aphids, weevils( Calandra), bedbugs (*Cimex lectularius*), roaches and the common housefly.

For pesticidal purposes the compounds according to the present invention are disseminated in the form of compositions consisting essentially of an inert carrier and a pesticidally effective amount of the active ingredient. The inert carrier may be a gaseous substance, such as a propellant gas, or a liquid or solid substance. In addition, the compositions may comprise one or more other inert additives, such as emulsifiers, extenders and substances which increase the adherence of the compositions to surfaces or objects to which they may be applied. The compounds of the present invention may be the sole active pesticidal ingredients in the compositions, or they may be combined with other pesticidal agents. Examples of suitable forms of such compositions are, among others: dusting powders, suspensions, emulsions, solutions, aerosols, fumigating paper or powder, and ointments.

The preferred concentration of the compounds according to the present invention in such pesticidal compositions is from 0.01 to 5% by weight.

The following examples illustrate various types of pesticidal compositions comprising a compound of the present invention as the active ingredient.

EXAMPLE 8

Emulsion 25 gm. of a compound of the Formula I, 70 gm. of dimethylformamide and 5 gm. of nonylphenol polyglycol ether (emulsifier) were emulsified in an amount of water sufficient to make the concentration of the active ingredient from 0.01 to 0.2% by weight, based on the overall weight of the emulsion.

This resulting pesticidal emulsion was highly effective against red spider mites, weevils, bedbugs and roaches.

EXAMPLE 9

Dusting powder.—5 gm. of a compound of the Formula I, 94 gm. of talcum and 1 gm. of methylcellulose were admixed and milled until a homogenous powder was obtained.

The dusting powder, comprising 5% of the pesticidal ingredient, was also very effective in combatting red spider mites, weevils, bedbugs and roaches.

EXAMPLE 10

Suspension.—A mixture of 50 gm. of a compound of the Formula I, 9 gm. of lignin sulfonate (dispersing agent), 1 gm. of sodium tetrapropylene benzene sulfonate (wetting agent) and 40 gm. of kaolin was milled, and the resulting intimate mixture was suspended in an amount of water sufficient to make the concentration of the active ingredient from 0.01 to 0.5% by weight, based on the overall weight of the suspension.

The resulting pesticidal suspension was also highly effective against red spider mite, weevils, bedbugs and roaches.

While the present invention has been illustrated with the aid of certain specific embodiments thereof, it will be readily apparent to others skilled in the art that the invention is not limited to these particular embodiments, and that various changes and modifications may be made without departing from the spirit of the invention or the scope of the appended claims.

I claim:

1. A compound of the formula

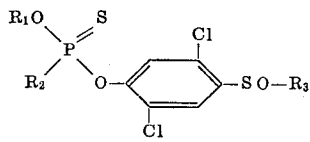

wherein
$R_1$ is alkyl of 1 to 3 carbon atoms,
$R_2$ is alkyl of 1 to 3 carbon atoms, methoxy, ethoxy or phenyl, and
$R_3$ is alkyl of 1 to 4 carbon atoms.

2. O,O - diethyl-O-(2,5-dichloro-4-methylsulfinylphenyl)-thionophosphate.

References Cited

FOREIGN PATENTS 242,406    5/1959    Australia    260—949

CHARLES B. PARKER, Primary Examiner

A. H. SUTTO, Assistant Examiner

U.S. Cl. X.R.

424—216

UNITED STATES PATENT OFFICE
CERTIFICATE OF CORRECTION

Patent No. 3,639,540  Dated February 1, 1972

Inventor(s) RICHARD SEHRING

It is certified that error appears in the above-identified patent and that said Letters Patent are hereby corrected as shown below:

Col. 1, line 49: "thionphosphoric" should read --thionophosphoric--

Col. 3, line 65: "$C_6H_5O$" should read --$C_6H_5$--.

Signed and sealed this 18th day of July 1972.

(SEAL)
Attest:

EDWARD M. FLETCHER, JR.
Attesting Officer

ROBERT GOTTSCHALK
Commissioner of Patents